United States Patent [19] [11] 3,881,517
Lloyd et al. [45] May 6, 1975

[54] FLUID FLOW CONTROL VALVES

[75] Inventors: Arthur Leslie Lloyd; Anthony Michael Parry-Evans, both of Wolverhampton; Terence John Capewell, Gnosall, all of England

[73] Assignee: Lucas Aerospace Limited, Birmingham, England

[22] Filed: July 27, 1973

[21] Appl. No.: 383,250

[30] Foreign Application Priority Data
Sept. 23, 1972 United Kingdom............... 44128/72

[52] U.S. Cl. ........ 137/637.1; 137/596; 137/625.22; 137/625.47; 137/637.5; 251/297
[51] Int. Cl. ...................... F16k 11/00; F16k 11/14
[58] Field of Search .......... 137/596, 625.21, 625.22, 137/625.23, 625.24, 637.1, 637.3, 637.5, 625.47, 625.48; 251/297

[56] References Cited
UNITED STATES PATENTS
| | | | |
|---|---|---|---|
| 574,062 | 12/1896 | Hall | 137/625.21 |
| 2,868,176 | 1/1959 | Bennett | 137/625.22 |
| 3,253,613 | 5/1966 | Richolt | 137/625.48 |

FOREIGN PATENTS OR APPLICATIONS
223,633 10/1924 United Kingdom............... 137/637.3

*Primary Examiner*—William R. Cline
*Assistant Examiner*—George L. Walton
*Attorney, Agent, or Firm*—Holman & Stern

[57] ABSTRACT

A fluid flow control valve comprising a body having a bore, an inlet port opening into said bore and at least one further port the connection of which to the inlet port is to be controlled, a first closure member in the form of a sleeve in said bore having an opening in communication with the inlet port and a port which is alignable with the further port so as to control the interconnection between the inlet port and said further port via the interior of the sleeve, a second closure member within the first closure member movable relative to the first closure member to cover or uncover said port therein, said closure members being operable in first and second distinct modes in the first of which said closure members move in unison to control the interconnection of said inlet port to said further port and in the second of which the closure members move relative to one another to control such interconnection, an input member on said second closure member for applying operating torque thereto; and spring loaded detent means acting between said first and second closure members and causing said closure members to be operated in said first mode when the torque applied is insufficient to overcome said detent means and in the second mode when the torque applied is sufficient to overcome said spring detent means.

2 Claims, 4 Drawing Figures

FLUID FLOW CONTROL VALVES

FIELD OF THE INVENTION

This invention relates to fluid flow control valves and has as an object to provide such a valve in a convenient form.

SUMMARY OF THE INVENTION

A fluid flow control valve in accordance with the invention comprises a body having a cylindrical bore, an inlet port opening into said bore and at least one further port the connection of which to the inlet port is to be controlled, a first closure member in the form of a sleeve in said bore having an opening in communication with the inlet port and a port which is alignable with the further port, and a second closure member within the first closure member movable relative to the first closure to cover or uncover said port whereby communication between the inlet port and said further port can be shut off either by said first closure member or by said second closure member.

DESCRIPTION OF THE PREFERRED EMBODIMENTS

Figure 1:
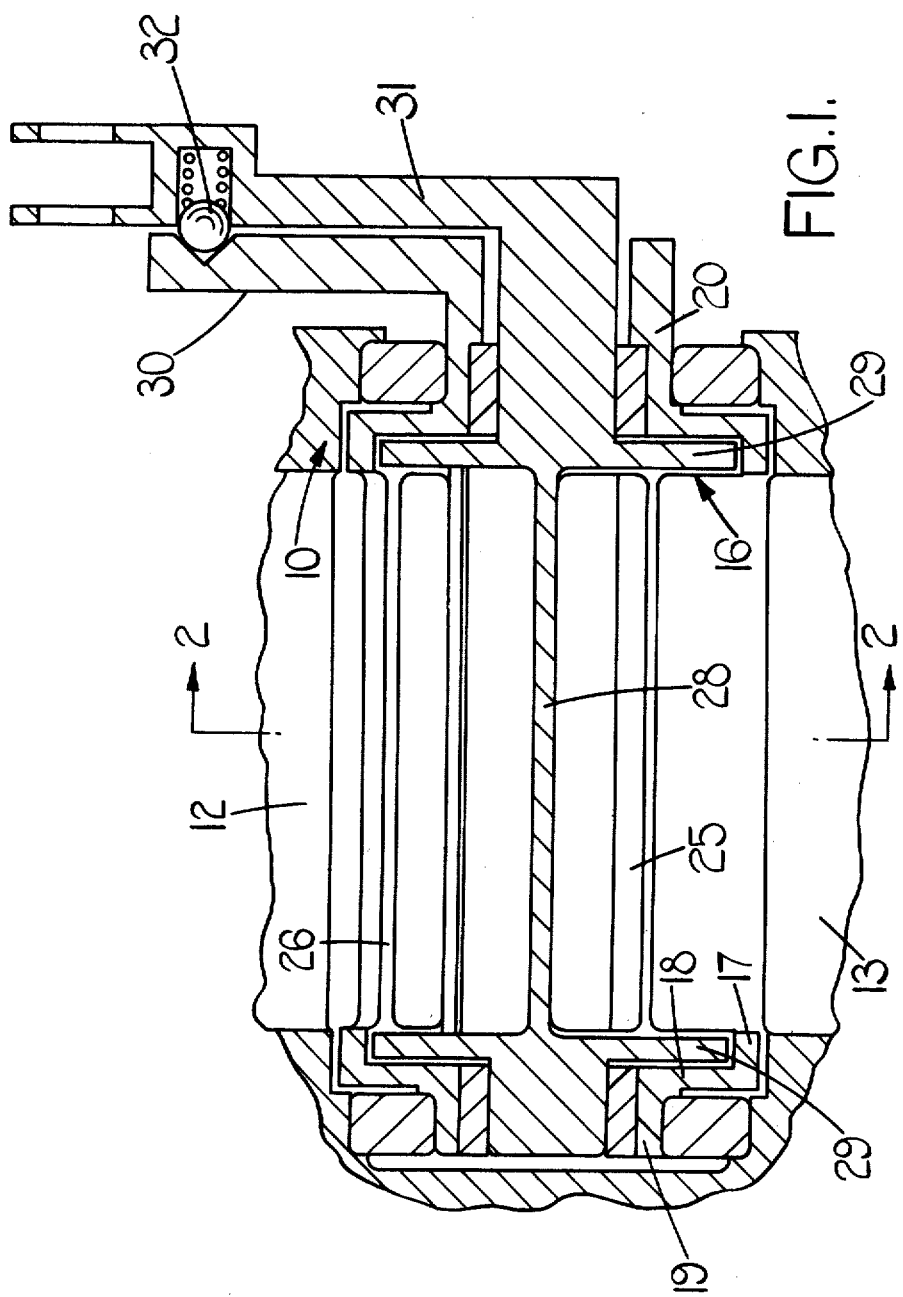
FIG. 1 is a section through an example of a valve in accordance with the invention.
Figure 2:
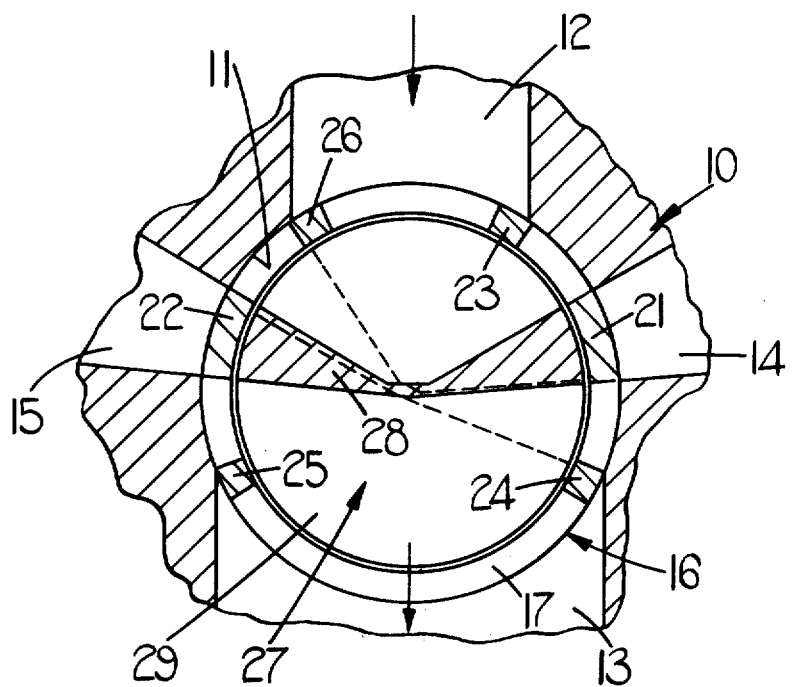
FIG. 2 is a section on line 2—2 in FIG. 1.

The valve shown in FIGS. 1 and 2 includes a body 10 in which there is formed a bore 11. Opening into this bore 11 are four rectangular ports, namely a pressure port 12, exhaust ports 13, and two further ports 14 and 15. Rotatably mounted in the bore 11 is a first closure member 16 which includes a sleeve like portion 17 and ends 18 with mounting trunnions 19 and 20, thereon. The sleeve-like portion 17 is pierced by six rectangular holes to leave a pair of main closure portions 21, 22 for covering the ports 14, 15 respectively and two pairs of further portions 23, 24, 25 and 26 on opposite sides of the respective main closure portions 21, 22. These portions 23 and 24 are spaced from the associated portion 21 by a distance equal to the width of the associated port 14 and the portions 25 and 26 are similarly spaced from the portion 22 in relation to the width of the port 15. The spacing between the closure portions 21 and 22 and the corresponding portions 23 and 26 is, however, less than the widths of the lands between the port 12 and the ports 14 and 15 respectively and similarly the spacing between the closure portions 21 and 22 and the corresponding portions 24 and 25 is less than the widths of the lands between the port 13 and the ports 14 and 15 respectively. Thus the member 16 can occupy the position shown in FIG. 2 with the portions 21, 22 covering the ports 14, 15 respectively and the portions 23, 24, 25, and 26 engaging the lands adjacent these ports.

Within the closure member 16 is a second closure member 27 which includes a vane 28 and a pair of end discs 29. The vane 28 has two blades of angular width equal to that of the portions 21, 22 of the closure member 16. These blades are disposed so that, as shown in FIG. 2, they can be aligned with the respective portions 21, 22. Each blade is of sufficient width, however to span any of the spaces between portions 21, 22 and the portions 23, 24, 25 and 26.

The two closure members 16, 27 have a pair of arms 30, 31 attached to them and a spring loaded ball detent 32 is provided for locating these two arms relative to one another in a position such that the closure members occupy the position shown in FIG. 2. The arm 31 has a forked end for connection to an actuating link (not shown).

In use the ports 14 and 15 are connected to an air motor, the port 12 is connected to a compressed air supply and the port 13 is connected to the exhaust. In the position shown the portions 21, 22 close the ports 14, 15 and the vane 28 prevents flow of air from the port 12 to exhaust. Movement of the arm 31 by the actuating link causes the two closure members to move in unison, so that either of ports 14 or 15 is connected to port 12 and the other is connected to port 13. The control system (not shown) for the valve has a feedback by the motor output shaft and when it is required to stop the motor this control system turns the arm 31 in the appropriate direction until movement of the motor output shaft ceases.

It may occur that foreign matter enters the valve and prevents the portions 21, 22 from closing the ports 14, 15 properly. For example, after the valve has been opened by turning the closure members 16 and 27 in an anticlockwise direction, a foreign body may lodge on the upper edge of the portion 22. When the closure members 16, 27 are turned in a clockwise direction the foreign body will prevent the portions 21, 22 from covering the ports 14, 15 so that ports 14, 15 remain in communication with ports 13 and 12 respectively. Thus the motor output shaft is not brought to rest and the arm 31 is turned further by the actuating link. The closure member 16 cannot continue to turn so that the detent 32 discharges and the further closure member 27 turns alone. When the blades of member 27 occupy the positions shown in dotted lines in FIG. 2, the ports 14, 15 will again be closed so that the motor is stopped and turning of the arm 31 is also stopped.

Thus it will be appreciated that, even though the air supply to the valve is not free from foreign matter there is very little danger of the motor running away when a valve blockage occurs.

Figure 3:
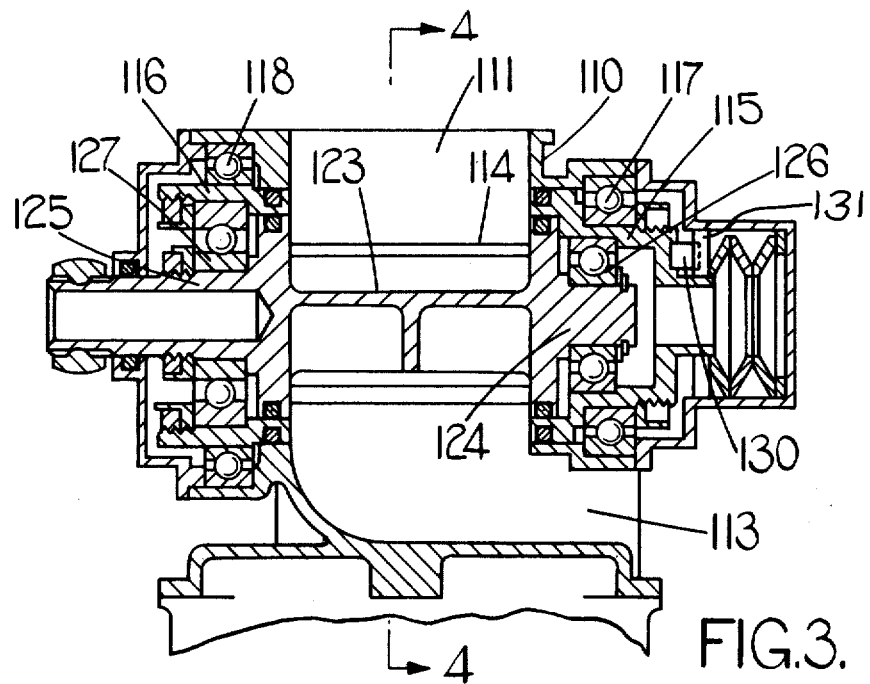
FIG. 3 is a view like FIG. 1 showing an alternative example of the invention.
Figure 4:
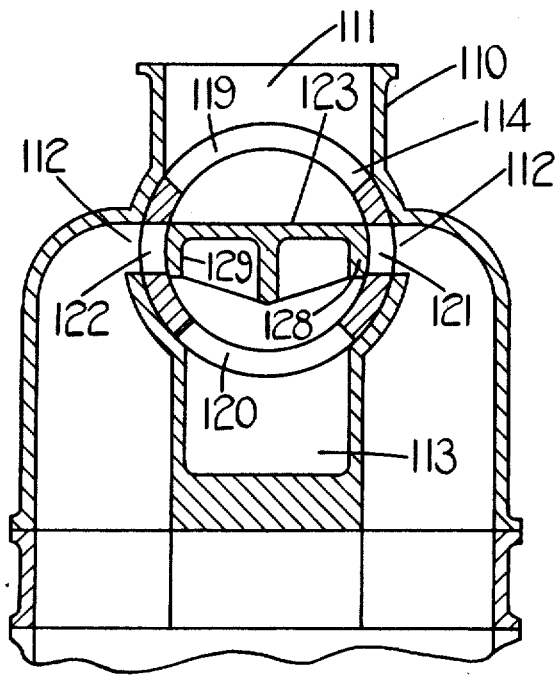
FIG. 4 is a section on line 4—4 of FIG. 3.

The valve shown in FIGS. 3 and 4 has a body 110 with an inlet 113, a pair of outlets 112 and an exhaust 111, all of which open into a cylindrical cavity in the body. Mounted in this cavity is a first closure member 114 in the form of a sleeve with end portions 115, 116 in bearings 117, 118 in the body. The member 114 has a pair of openings 119, 120 which communicate respectively with the exhaust passage 111 and the inlet 113, and a pair of ports 121, 122 which in a datum position of the member 114 communicate with the outlet 121 respectively. On opposite sides of each port 121, 122 the wall of the sleeve forms a pair of portions which can, on turning of the member 114 in opposite directions from its datum position cover and close off the corresponding outlet 112.

Within the sleeve 114 is a second closure member 123 basically in the form of a vane with spigots 124, 125 at its ends which supported in bearings 126, 127 in the member 114. The vane has portions 128, 129 which can, in the position shown, cover the ports 121, 122 respectively. Turning of the member 123 from the position shown wiithout corresponding displacement of the member 114 causes selective interconnection of the inlet and exhaust passage with the outlets 112. The member 114 is yieldably held in its datum position by detent means in the form of a roller 130 trapped between a spring loaded plate 131 and one end of the member 114. This end of the member has a radial groove into which the roller is urged by the plate 131.

In use the valve controls the supply of air to the pneumatic motor and is itself controlled by a servomechanism with a feedback, not from the position of the valve input member, which is formed by the spigot 125, but from the rotation of the motor. Turning the spigot 125 in opposite directions causes driving of the motor in opposite directions. In the event that any foreign matter lodged on either of the members 114, 123 prevents closing of the ports 121, 122, the servomechanism will continue to turn the spigot 125 beyond its normal closed position. Such angular movement will be transmitted to the member 114 via the foreign matter and the member 114 will then be displaced with the member 123 until the outlets 112 are closed off by member 114.

We claim:

1. A fluid flow control valve comprising a body having a bore, an inlet port opening into said bore and at least one further port the connection of which to the inlet port is to be controlled, a first closure member in the form of a sleeve in said bore having an opening in communication with the inlet port and a port which is alignable with the further port so as to control the interconnection between the inlet port and said further port via the interior of the sleeve, a second closure member within the first closure member movable relative to the first closure member to cover or uncover said port therein, said closure members being operable in first and second distinct modes in the first of which said closure members move in unison to control the interconnection of said inlet port to said further port and in the second of which the closure members move relative to one another to control such interconnection, an input member on said second closure member for applying operating torque thereto; and spring loaded detent means acting between said first and second closure members and causing said closure members to be operated in said first mode when the torque applied is insufficient to overcome said detent means and in the second mode when the torque applied is sufficient to overcome said spring detent means.

2. A fluid flow control valve as claimed in claim 1 in which the body has a pair of said further ports and an exhaust port, said first closure member having a first pair of ports which connect the inlet port to one further port and the exhaust port to the other further port when the first closure member is displaced in one direction from a datum position and a second pair of ports which connect the inlet port to said other further port and the exhaust port to said one further port when the first closure member is turned in the opposite direction from the datum position, the second closure member being in the form of a vane for closing said first pair of ports when the second closure member is turned in said other direction relative to the first closure member and closing said second pair of ports when the second closure member is turned in said one direction relative to the first closure member.

* * * * *